United States Patent
Omi et al.

(10) Patent No.: US 9,321,324 B2
(45) Date of Patent: Apr. 26, 2016

(54) VEHICLE AIR-CONDITIONING UNIT AND VEHICLE

(71) Applicants: Valeo Japan Co., Ltd., Kumagaya-shi (JP); Nissan Motor Co., Ltd., Yokohama-shi (JP)

(72) Inventors: Hironori Omi, Kumagaya (JP); Takafumi Uehara, Yokohama (JP); Fujio Arai, Yokohama (JP); Takuya Furutani, Yokohama (JP)

(73) Assignees: VALEO JAPAN CO. LTD., Kumagaya-Shi (JP); NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/372,904

(22) PCT Filed: Jan. 16, 2013

(86) PCT No.: PCT/JP2013/050647
§ 371 (c)(1),
(2) Date: Jul. 17, 2014

(87) PCT Pub. No.: WO2013/108774
PCT Pub. Date: Jul. 25, 2013

(65) Prior Publication Data
US 2015/0027799 A1    Jan. 29, 2015

(30) Foreign Application Priority Data

Jan. 20, 2012   (JP) ................................. 2012-010185

(51) Int. Cl.
*B60H 1/22*    (2006.01)
*B60H 1/00*    (2006.01)
*F24H 9/18*    (2006.01)

(52) U.S. Cl.
CPC ........ *B60H 1/00521* (2013.01); *B60H 1/00592* (2013.01); *B60H 1/22* (2013.01); *B60H 1/2225* (2013.01); *F24H 9/1863* (2013.01); *B60H 2001/2287* (2013.01)

(58) Field of Classification Search
CPC .......... B60H 1/00514; B60H 1/00521; B60H 1/00528; B60H 1/00535; B60H 1/00542; B60H 1/0055; B60H 1/00592; B60H 1/2215; B60H 1/2225; B60H 2001/2287; B60H 1/22; B60H 1/00; F24H 3/0452; F24H 3/0458; F24H 3/0464; F24H 3/047; F24H 3/0482; F24H 9/1872; F24H 9/1863; F24H 9/1854; H05B 2203/023
USPC .......... 180/271, 274; 165/41, 42, 43, 44, 202; 219/202; 237/12.3 A
See application file for complete search history.

(56) References Cited

U.S. PATENT DOCUMENTS 3,424,263 A * 1/1969 Black ............................. 280/777
3,469,073 A * 9/1969 Zechin .......................... 392/307

(Continued)

FOREIGN PATENT DOCUMENTS

| JP | S 56-108943 U | 8/1981 |
| JP | H 07-108816 A | 4/1995 |

(Continued)

OTHER PUBLICATIONS

Definition of "on", http://www.thefreedictionary.com/on, Sep. 2, 2015.*

(Continued)

*Primary Examiner* — Keith Frisby
(74) *Attorney, Agent, or Firm* — Howard & Howard Attorneys PLLC (57) ABSTRACT

Preventing high-voltage components which constitute an electric instrument stored in a case from being exposed, dropping out, or scattering to an outside from the case even when the case of an air-conditioning unit has a significant impact. Therefore, a vehicle air-conditioning unit is provided with a protecting structure for preventing the electric instrument from scattering.

13 Claims, 10 Drawing Sheets

(56) References Cited

U.S. PATENT DOCUMENTS

| | | | | |
|---|---|---|---|---|
| 5,865,940 | A | * 2/1999 | Li | 156/379.6 |
| 2002/0153132 | A1 | 10/2002 | Nagano | |
| 2005/0046218 | A1* | 3/2005 | Campbell | 296/39.3 |

FOREIGN PATENT DOCUMENTS

| | | |
|---|---|---|
| JP | H 10-076842 A | 3/1998 |
| JP | 2000-272332 A | 10/2000 |
| JP | 2001-001751 A | 1/2001 |
| JP | 2004-142587 A | 5/2004 |
| JP | 2005-334765 A | 12/2005 |
| JP | 2012-144173 A | 8/2012 |

OTHER PUBLICATIONS

International Search Report for Application No. PCT/JP2013/050647 dated Apr. 23, 2013, 5 pages.

English language abstract and machine-assisted English translation for JPH 07-108816 extracted from the PAJ database on Aug. 14, 2014, 34 pages.

English language abstract and machine-assisted English translation for JPH 10-076842 extracted from the PAJ database on Jun. 24, 2014, 6 pages.

English language abstract for JP 2000-272332 extracted from the PAJ database on Aug. 14, 2014, 2 pages.

English language abstract and machine-assisted English translation for JP 2001-001751 extracted from the PAJ database on Aug. 14, 2014, 17 pages.

English language abstract and machine-assisted English translation for JP 2004-142587 extracted from the PAJ database on Aug. 14, 2014, 23 pages.

English language abstract and machine-assisted English translation for JP 2005-334765 extracted from the PAJ database on Jun. 24, 2014, 9 pages.

English language abstract and machine-assisted English translation for JP 2012-144173 extracted from the PAJ database on Aug. 14, 2014, 18 pages.

English language translation of Claims for Japanese Utility Model Application No. 006577/1980 (Laid-open No. 108943/1981; JPS 56-108943) provided by Ohnuki & Kotake on Oct. 5, 2014, 1 page.

* cited by examiner

Fig.10

VEHICLE AIR-CONDITIONING UNIT AND VEHICLE

RELATED APPLICATIONS

This application is the National Stage of International Patent Application No. PCT/JP2013/050647, filed on Jan. 16, 2013, which claims priority to and all the advantages of Japanese Patent Application No. 2012-010185, filed on Jan. 20, 2012, the content of which is incorporated herein by reference.

TECHNICAL FIELD

The present invention relates to a vehicle air-conditioning unit configured to be capable of preventing collateral damage that may happen when savers who save passengers of a vehicle after a collision or the like or handlers who perform handling after the collision of the vehicle touch high-voltage components of an electric instrument when the electric instrument such as an electric heating apparatus, a dust collecting apparatus using a high voltage, or an ozone generating apparatus using a high voltage is stored in a case, and a vehicle provided with the vehicle air-conditioning unit.

BACKGROUND ART

In recent years, electric vehicles (EV) and hybrid vehicles are generally used. In such electric vehicles and hybrid vehicles, an electric heating apparatus such as a PTC heater is stored in a case of a vehicle air-conditioning unit instead of or in association with a heating heat exchanger using warm water such as a heater core, for example as described in PTL 1.

Also, there is a case where a dust collecting apparatus and an ozone generating apparatus using a high voltage are stored in a case of the vehicle air-conditioning unit as described, for example, in PTL 2 and PTL 3 in order to collect dust contained in air taken from the outside into the vehicle air-conditioning unit by an air blower or to remove odor of the air taken thereto.

High-voltage components are generally provided in a case in order to cause a heat generator to generate heat in the electric heating apparatus described in PTL 1, for causing corona discharge in the dust collecting apparatus described in PTL 2, and for generating ozone in the ozone generating apparatus described in PTL 3.

CITED REFERENCE

Patent Literature

PTL 1: JP-A-2000-272332
PTL 2: JP-A-2005-334765
PTL 3: JP-A-10-76842

SUMMARY

Technical Problem

When a vehicle has an impact due to a collision or the like with another vehicle or a construction or the like such as a utility pole, the air-conditioning unit mounted on the vehicle also has an impact, so that a case formed of resin which constitutes an outer shell of the air-conditioning unit may be broken or deformed and, depending on the degree of the impact, the case may be fractured. Simultaneously with the breakage or deformation of the vehicle air-conditioning unit in this manner, the electric heating apparatus, the dust collecting apparatus, and the ozone generating apparatus stored in the case of the air-conditioning unit may also be damaged.

At this time, high-voltage components that the electric heating apparatus or the like has in the case may be exposed to the outside of the case of the vehicle air-conditioning unit, dropped out from the case, or even disperse in the periphery while maintaining an energized state. Therefore, prevention of a collateral damage that may occur when savers for passengers or handlers touch the high-voltage components in the energized state, which are exposed to the outside of the case, dropped out from the case, or scattered in all directions with their fingers needs to be considered from the safety point of view.

Accordingly, it is an object of the present invention to provide a vehicle air-conditioning unit configured to be capable of preventing high-voltage components which constitute an electric instrument stored in a case which corresponding to an outer shell of the vehicle air-conditioning unit from being exposed to the outside, dropping out, or scattering from the case even when the case has a significant impact and a vehicle provided with such a vehicle air-conditioning unit.

Solution to Problem

A vehicle air-conditioning unit according to the present invention is a vehicle air-conditioning unit in which air is introduced from an outside into a case and air-conditioned air is fed into a cabin with an air blower, and including an electric instrument having high-voltage components and being stored in a case, and is characterized by including a protecting structure configured to prevent the electric instrument from scattering. Here, examples of the electric instrument provided with the high-voltage components include an electric heating apparatus such as a PTC heater, a dust collecting apparatus using a high voltage, and an ozone generating apparatus using a high voltage. Examples of the vehicle air-conditioning unit include a center installation fully-integrated type and a center installation semi-integrated type.

Accordingly, since the case in which the electric instrument provided with the high-voltage components are stored includes the protecting structure configured to prevent the electric instrument from scattering, even when the case is broken or deformed, the electric instrument is prevented from dropping out, scattering or being exposed from the case because the protecting structure configured to protect the electric instrument provided with the high-voltage components is provided separately from the case.

The vehicle air-conditioning unit of the present invention is characterized in that the protecting structure is arranged outside the case. Accordingly, the protecting structure may be mounted after the manufacture of the case, and may be mounted easily in a direction in which dropping out, scatter, or exposure of the electric instrument out of the case is supposed.

The vehicle air-conditioning unit of the present invention is characterized in that the protecting structure is formed of a conductive material, and is provided with an earth circuit mounted thereon. Accordingly, an electric circuit for grounding of the electric instrument may be provided via the protecting structure, so that the safety of passengers, savers for the passengers, and handlers may be enhanced.

The vehicle air-conditioning unit of the present invention is characterized in that the protecting structure is formed of a plate-shaped member. In other words, each of protecting members is formed of a plate-shaped member. Accordingly, contact of fingers of the passengers, the savers for the passengers, the handlers, and the like to the high-voltage components of the electric instrument is prevented by itself, so that a collateral damage caused by contact of the passenger, the saver for the passengers, the handlers, and the like with the high-voltage components of the electric instrument is prevented.

The vehicle air-conditioning unit of the present invention is characterized in that the protecting structure is formed of a flexible member. In other words, each of protecting members is formed of a flexible material. The flexible material includes elastic synthetic resin materials such as wires or rubbers. Accordingly, even when the protecting structure has a significant impact, the impact can be absorbed, so that the protecting structure is prevented from becoming damaged by the impact exerted to the vehicle.

The vehicle air-conditioning unit according to the present invention is characterized in that the protecting structure is composed of any one of a lower side protecting member arranged on a lower side of the electric instrument in a vehicle vertical direction, a rear side protecting member arranged on a rear side of the electric instrument in a vehicle fore-and-aft direction, a left side protecting member arranged on a left side of the electric instrument in a vehicle lateral direction, and a right side protecting member arranged on a right side of the electric instrument. In other words, only the lower side protecting member, the rear side protecting member, the left side protecting member, or the right side protecting member may be used as the protecting structure.

Accordingly, by arranging the protecting structure on a side opposite to a side of the vehicle where an impact is applied with respect to the electric instrument, even when the protecting structure is composed of any one of the lower side protecting member, the right side protecting member, the left side protecting member, or the rear side protecting member, the electric instrument is prevented from dropping out, scattering, or exposed from the case.

The vehicle air-conditioning unit according to the present invention is characterized in that the protecting structure is composed of at least two or more of the lower side protecting member arranged on a lower side of the electric instrument in a vehicle vertical direction, the rear side protecting member arranged on a rear side of the electric instrument in a vehicle fore-and-aft direction, the left side protecting member arranged on a left side of the electric instrument in a vehicle lateral direction, and the right side protecting member arranged on a right side of the electric instrument, and in that a plurality of the protecting members are formed by being integrally coupled. Examples of coupling of the plurality of protecting members include coupling of the two adjacent protecting members such as the lower side protecting member and the rear side protecting member, or the lower side protecting member and the right side protecting member, coupling of three protecting members such as the lower side protecting member, the right side protecting member, and the left side protecting member, or coupling of four protecting members such as the lower side protecting member, the right side protecting member, the left side protecting member, and the rear side protecting member.

In this manner, since the surface of the protecting structure that protects the electric instrument is increased by configuring the protecting structure with two or more of the lower side protecting member, the right side protecting member, the left side protecting member, and the rear side protecting member, even when the case is broken or deformed due to an impact on the vehicle, the electric instrument is prevented from dropping out, scattering, or exposed from the case further reliably.

In particular, in a case where the protecting structure is formed by coupling four protecting members, namely, the lower side protecting member, the right side protecting member, the left side protecting member, and the rear side protecting member, even when not only a bottom portion, but also the entire or a major part of the case are broken or deformed by the impact exerted to the vehicle from the front in the vehicle traveling direction, the high-voltage components of the electric instrument are prevented from scattering rearward of the vehicle traveling direction. The protecting structure formed by coupling the four protecting members, namely, the lower side protecting member, the right side protecting member, the left side protecting member, and the rear side protecting member has a certain extent of strength as a frame-shaped structure when a material having relatively high rigidity is used for the respective protecting members because the respective protecting members are integrally coupled, whereby a possibility that one of the both side surfaces of the protecting structure in the vehicle lateral direction is opened due to the impact exerted to the vehicle is avoided, so that scatter or exposure of the electric instrument may be prevented further reliably.

The vehicle air-conditioning unit of the present invention is characterized in that the protecting structure is formed by mounting the lower side protecting member, the rear side protecting member, the left side protecting member, and the right side protecting member respectively to the case, and then coupling the four protecting members to each other, the case is formed with projections on two or more surfaces of four surfaces thereof opposing four surfaces of the protecting structure, the protecting structure is provided with through holes at positions corresponding to the projections, the projections and the through holes are fitted to each other when the four protecting members are mounted on the case, and a length from a distal end of one of the projections to a distal end of the other projection is longer than a length between opening edges of the two through holes to which the two projections are fitted. Accordingly, unintentional removal of the protecting members in a case where a user of the vehicle does maintenance by him/herself is prevented.

The vehicle includes the vehicle air-conditioning unit. Accordingly, a vehicle capable of preventing the high-voltage components which constitute the electric instrument stored in a case from dropping out, or scattering, or being exposed to the outside from the case even when the case which constitutes an outer shell of the air-conditioning unit has a significant impact is provided.

As described above, since the case in which the electric instrument provided with the high-voltage components is stored includes the protecting structure configured to prevent the electric instrument from scattering, even when the case is broken or deformed, the electric instrument may be prevented from dropping out, or scattering from the case because the protecting structure configured to protect the electric instrument provided with the high-voltage components is provided separately from the case.

In particular, since the protecting structure is arranged outside of the case, the protecting structure may be mounted after the manufacture of the case, and may be mounted easily in the direction in which dropping out, scatter, or exposure of the electric instrument out of the case is supposed.

In particular, the electric circuit for grounding of the electric instrument may be provided via the protecting structure, so that the safety of the passengers, the savers for the passengers, and the handlers may be enhanced.

In particular, contact of the passengers, the savers for the passengers, and the handlers with the high-voltage components with their fingers may be prevented further effectively and further reliably.

In particular, even when the protecting structure has a significant impact, the impact can be absorbed, so that the protecting structure may be prevented from becoming damaged by the impact exerted to the vehicle.

In particular, by arranging the protecting member on a side opposite to a side of the vehicle where an impact is applied with respect to the electric instrument, even when the protecting structure is composed of one of the lower side protecting member, the right side protecting member, the left side protecting member, or the rear side protecting member, the electric instrument may be prevented from dropping out, scattering, or exposed from the case.

In particular, since the surface of the protecting structure that protects the electric instrument is increased by configuring the protecting structure with two or more of the lower side protecting member, the right side protecting member, the left side protecting member, and the rear side protecting member, even when the case is broken or deformed due to an impact on the vehicle, the electric instrument is prevented from dropping out, scattering, or exposed from the case further reliably.

In addition, in a case where the protecting structure is formed by coupling four protecting members, namely, the lower side protecting member, the right side protecting member, the left side protecting member, and the rear side protecting member, even when not only a bottom portion, but also the entire or a major part of the case are broken or deformed by the impact exerted to the vehicle from the front in the traveling direction, the high-voltage components of the electric instrument may be prevented from scattering rearward of the vehicle traveling direction. The protecting structure formed by coupling the four protecting members, namely, the lower side protecting member, the right side protecting member, the left side protecting member, and the rear side protecting member has a certain extent of strength as a frame-shaped structure when a material having relatively high rigidity is used for the respective protecting members because the respective protecting members are integrally coupled, whereby a possibility that one of the both side surfaces of the protecting structure in the vehicle lateral direction is opened due to the impact exerted to the vehicle is avoided, so that scatter or exposure of the electric instrument may be prevented further reliably.

In particular, unintentional removal of the protecting structure in a case where a user of the vehicle does maintenance by him/herself may be prevented.

In particular, a vehicle capable of preventing the high-voltage components which constitute the electric instrument stored in a case from dropping out, or scattering, or being exposed to the outside from the case even when the case which constitutes an outer shell of the air-conditioning unit has a significant impact may be provided.

DESCRIPTION OF EMBODIMENTS

Hereinafter, embodiments of the present invention will be described with reference to attached drawings.

An example of a vehicle air-conditioning unit 1 according to the present invention is illustrated in FIG. 1 to FIG. 4. The vehicle air-conditioning unit 1 is of a vertical center installation fully-integrated type to be mounted on a center console portion of a vehicle, for example. The vehicle air-conditioning unit 1 is arranged on a cabin side of a partitioning plate 60 which partitions an engine room defined in the front of a vehicle traveling direction and the cabin, and basically includes an air conditioning unit body 2 and an intake portion 3.

Figure 1:
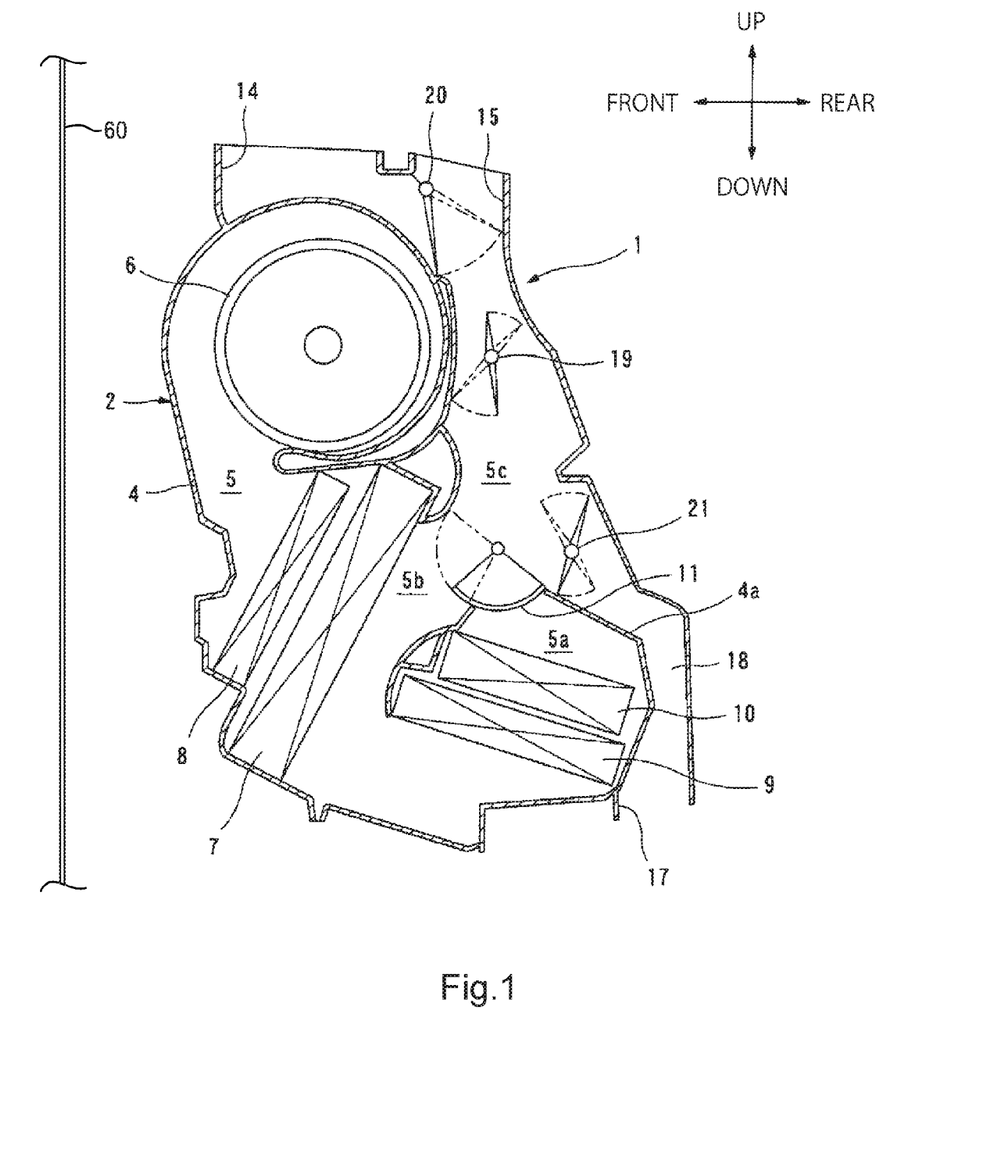
FIG. 1 is a cross-sectional view illustrating a schematic configuration of an air conditioning unit body of a vehicle air-conditioning unit of a center installation fully-integrated type as an example of the vehicle air-conditioning unit of the present invention.

The air conditioning unit body 2 stores an air blower 6 for feeding air from the intake portion 3 to a downstream side, a cooling heat exchanger 7 such as an evaporator configured to cool the air fed from the air blower 6, an air filter 8 arranged on an upstream side of the cooling heat exchanger 7, two types of heaters 9, 10 for re-heating the air cooled by the cooling heat exchanger 7, and an air mix door 11 configured to adjust the ratio of air to be fed to the heaters 9, 10 and air to be bypassed in an air flow channel 5 formed in a case 4. Instead of the air filter 8, a dust collecting apparatus using a high voltage, or an ozone generating apparatus using a high voltage may be used although illustration is omitted.

The air blower 6 in this embodiment includes a fan referred to as a centrifugal multi-blade fan (sirocco fan), and a motor configured to drive the fan, and the motor is arranged by forming an opening portion formed in the case 4 so as to open in a vehicle lateral direction and being inserted on its side therefrom with a drive shaft of the motor extending along the lateral direction of the vehicle.

The air filter 8 and the cooling heat exchanger 7 are arranged so that all the air introduced from the air blower 6 passes therethrough in the air flow channel 5. The cooling heat exchanger 7 is formed, for example, by stacking corrugated fins and tubes alternately by a plurality of layers, includes a tank at a longitudinal end of the tube, and constitutes a freezing cycle by being joined with other air-conditioning apparatuses, which are not illustrated, via piping. In this embodiment, the air blower 6 is arranged above the cooling heat exchanger 7.

The heaters 9, 10 arranged on the downstream side of the cooling heat exchanger 7 are a warm water heater 9 located at a position closer to the cooling heat exchanger 7 on the downstream side of the air flow channel 5, and an electric heater 10 located at a position farther from the cooling heat exchanger 7 on the downstream side of the air flow channel 5. The warm water heater 9 is formed for example, by stacking the corrugated fins and tubes alternately by a plurality of layers and includes a tank at a longitudinal end of the tube.

Figure 5:
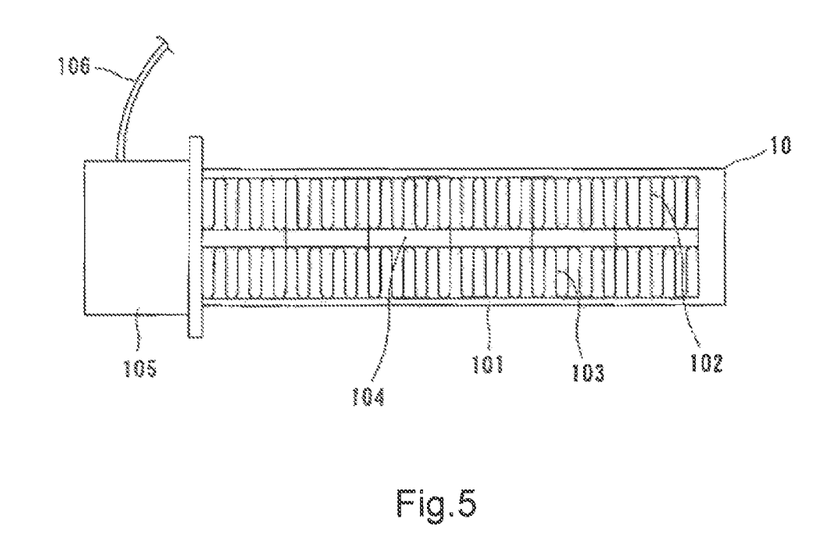
FIG. 5 is an explanatory drawing illustrating an example of the electric heater stored in a case of the vehicle air-conditioning unit.

The electric heater 10 is, for example, a PTC heater or the like, and an example of the configuration thereof will be described with reference to FIG. 5. The electric heater 10 illustrated in FIG. 5 includes a heating portion 101 having a heating element 104 arranged between corrugated fins 102 and corrugated fins 103, and a box portion 105 in which high-voltage components for causing the heating element to generate heat are stored, and further includes a cord 106 for supplying electric power to the high-voltage components stored in the box portion 105. The heating element 104 is, for example, a PTC semiconductor.

In addition, the air conditioning unit body 2 is provided with a warm air flow channel 5a where the air re-heated by the heaters 9, 10 passes as part of the air flow channel 5 on an upper side in the vehicle vertical direction, which corresponds to the downstream side of the heaters 9, 10, and a cold air flow channel 5b formed on the upper side of the heaters 9, 10 in the vehicle vertical direction and the front side in the vehicle traveling direction on the downstream side of the cooling heat exchanger 7 in the case 4. The air mix door 11 is arranged at a joint portion between the warm air flow channel 5a and the cold air flow channel 5b to adjust the ratio between cold air and warm air fed to an air mix chamber 5c on the downstream side of the warm air flow channel 5a and the cold air flow channel 5b. The air mix door 11 used in this embodiment is a rotary door.

Furthermore, a defrost ejection opening 14, a center vent ejection opening 15, side vent ejection openings 16, 16, and a foot ejection opening 17 are opened as needed in the case 4 on the downstream side of the air mix chamber 5c in the air flow channel 5 of the air conditioning unit body 2. In this embodiment, an air guide channel 18 configured to guide air from the downstream side of the heaters 9, 10 to the foot ejection opening 17 is formed, and the air guide channel 18 is partitioned from a portion where the heaters 9, 10 are stored by a partitioning wall 4a.

An ejection mode switching door 19 configured to adjust the flow rate of the air directed toward the defrost ejection opening 14 and the vent ejection openings 15, 16 is arranged on the downstream side and the upper side of the air mix chamber 5c of the air flow channel 5 in the vehicle vertical direction, and an ejection mode switching door 20 configured to adjust the rate between the flow rate of the air fed from the defrost ejection opening 14 and the flow rate of the air fed from the vent ejection openings 15, 16 is arranged on the downstream side and the upper side in the vehicle vertical direction of the ejection mode switching door 19. In this embodiment, the ejection mode switching door 19 is of a butterfly type, and the ejection mode switching door 20 is of a type referred to as a cantilevered, or a flag type. It is true that the arrangement and the type of the ejection mode switching doors 19, 20 are not limited to those illustrated in the drawing and, for example, a defrost ejection mode switching door and a vent ejecting mode switching door may be arranged in the vicinity of respective opening ends of the defrost ejection opening 14 and the vent ejection openings 15, 16. An ejection mode switching door 21 configured to adjust the flow rate of the air fed from the foot ejection opening is arranged on the upstream side of the air guide channel 18. In this embodiment, the ejection mode switching door 21 is a butterfly type.

The intake portion 3 is configured to feed air to the air blower 6 of the air conditioning unit body 2 provided in parallel, and includes an outside air introducing port and an inside air introducing port formed in the case, and an inside-outside air switching door for selecting the outside air introducing port and the inside air introducing port as needed stored in the case.

Figure 2:
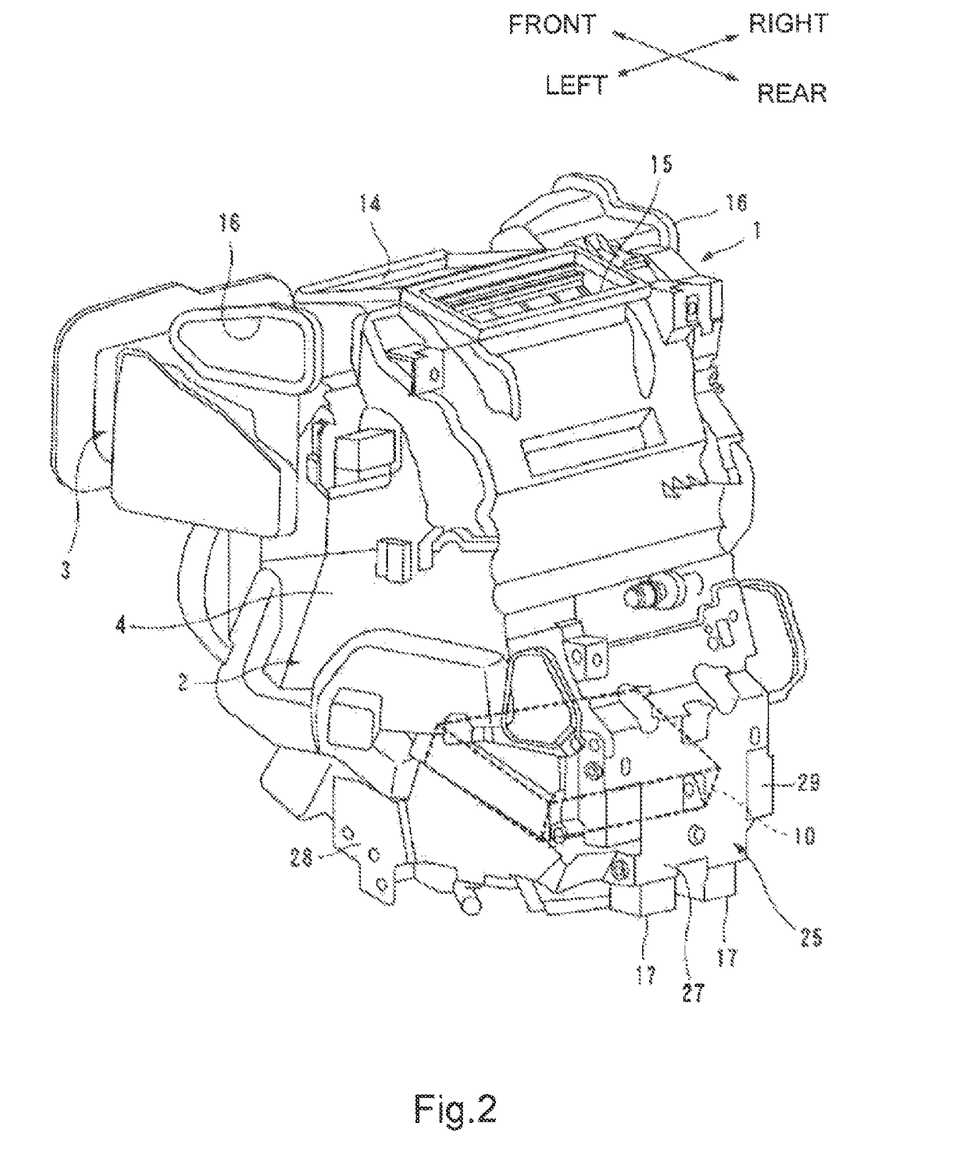
FIG. 2 is an explanatory drawing illustrating positions of storage of a protecting structure and an electric heater in a state of viewing the vehicle air-conditioning unit described above from the rear on the obliquely left side in a vehicle traveling direction.
Figure 3:
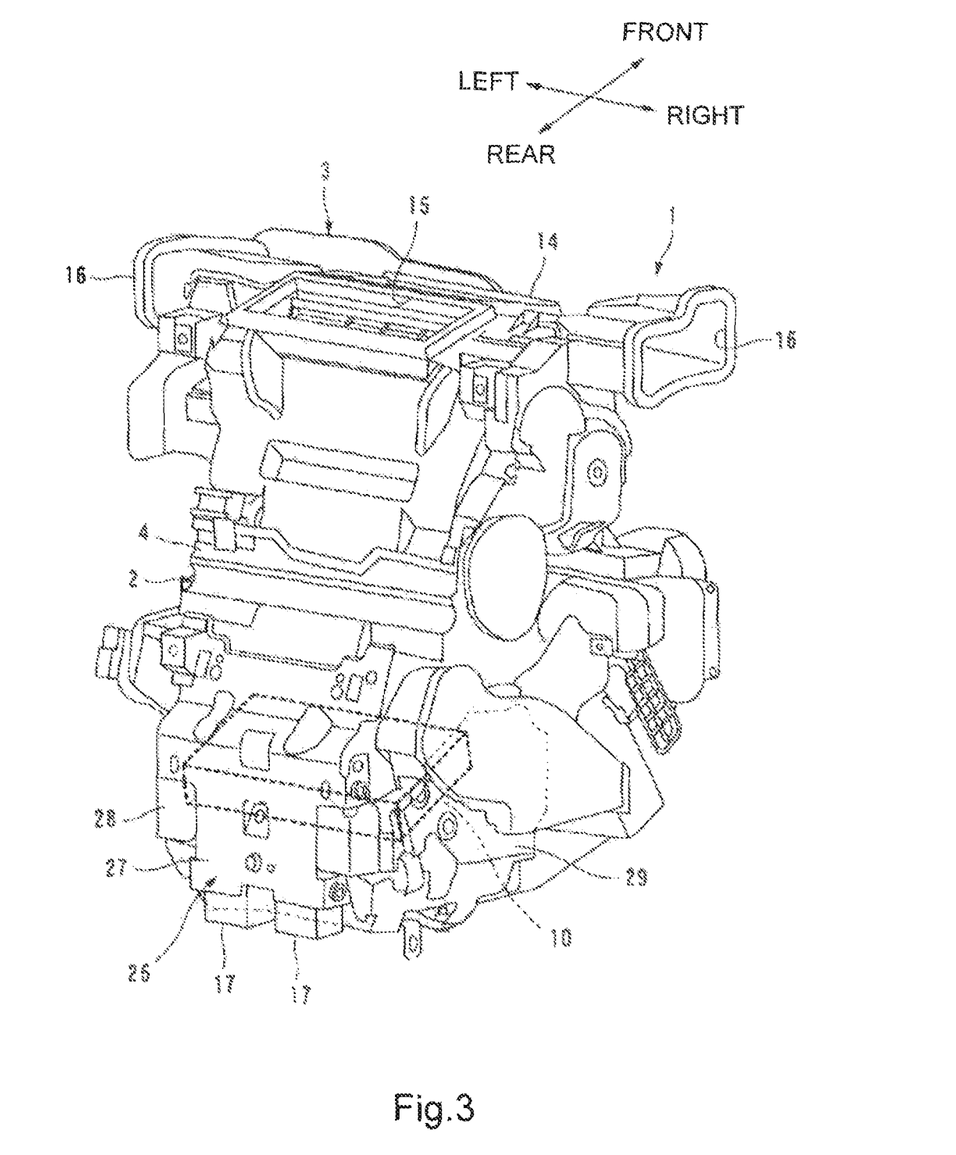
FIG. 3 is an explanatory drawing illustrating positions of storage of the protecting structure and the electric heater in a state of viewing the vehicle air-conditioning unit described above from the rear on the obliquely right side in the vehicle traveling direction.
Figure 4:
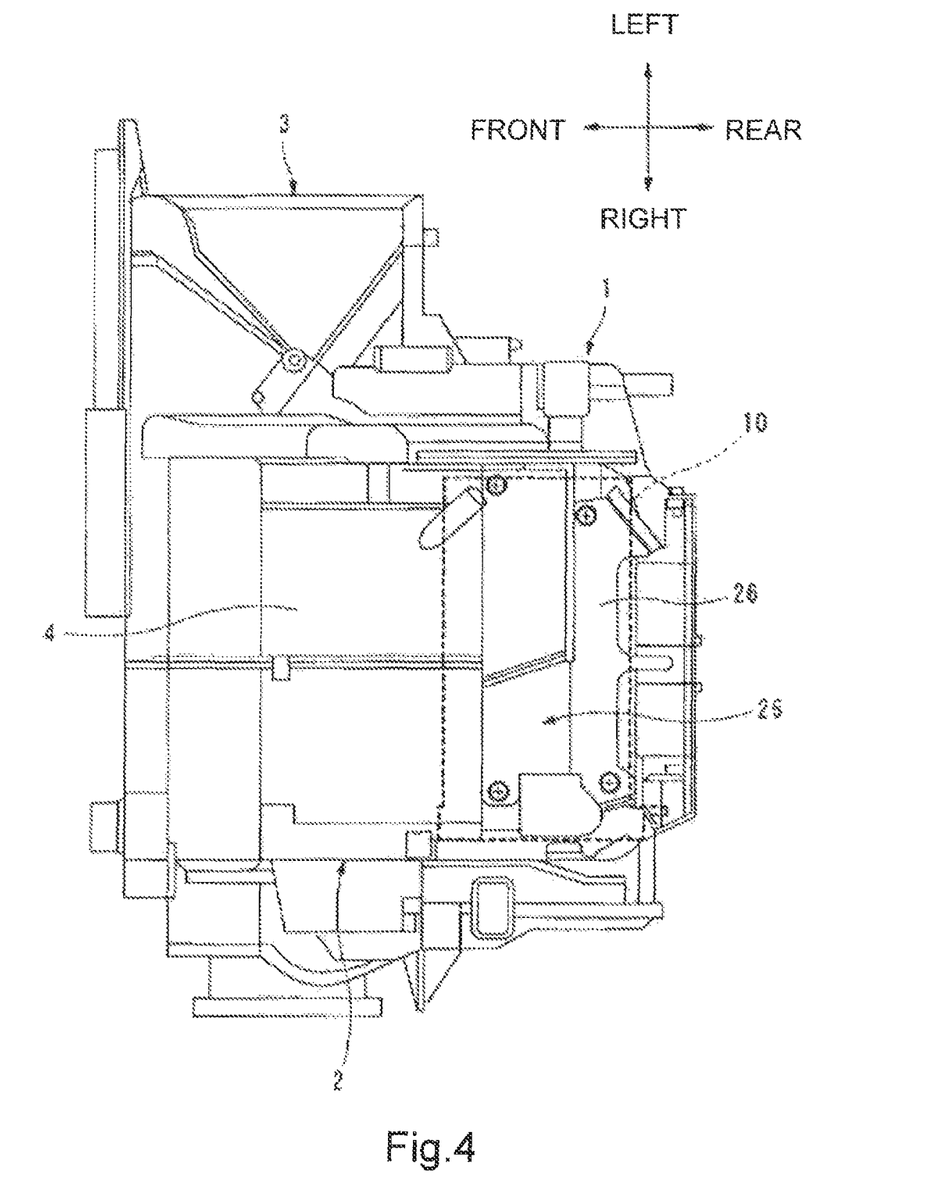
FIG. 4 is an explanatory drawing illustrating positions of storage of the protecting structure and the electric heater in a state of viewing the vehicle air-conditioning unit described above from below in a vehicle vertical direction.

As illustrated in FIG. 2 to FIG. 4, in the vehicle air-conditioning unit 1 in this embodiment, a protecting structure 25 is arranged outside the case 4 in a state of surrounding the lower side in the vehicle vertical direction, the both sides in the vehicle lateral direction, and the rear side in the vehicle traveling direction of the electric heater 10.

Figure 6:
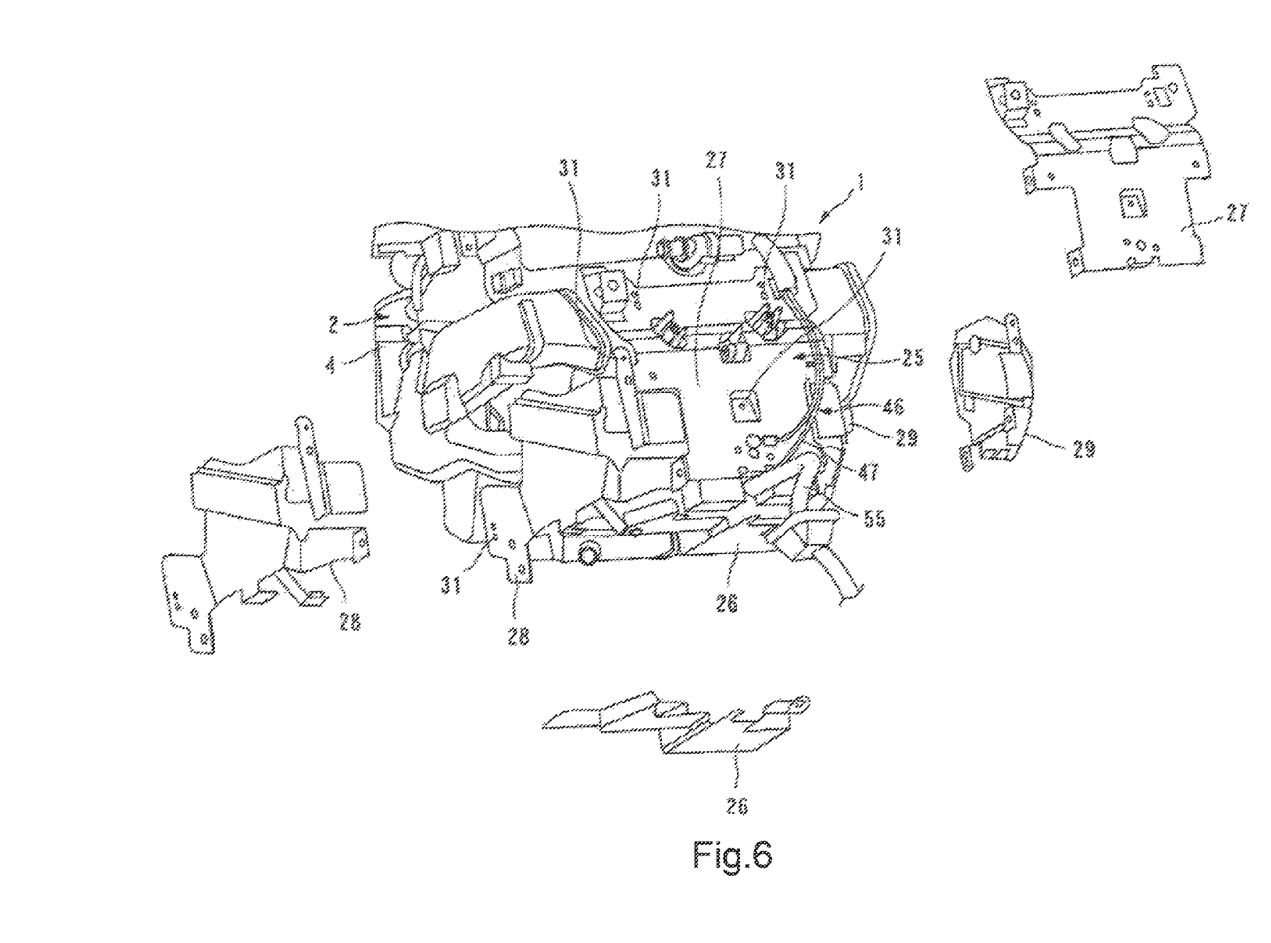
FIG. 6 is an explanatory drawing illustrating structures of respective protecting members in a lower side portion of the vehicle air-conditioning unit described above, and a state in which the respective protecting members are mounted on the case to form the protecting structure.

The protecting structure 25 in this embodiment includes a lower side protecting member 26, a rear side protecting member 27, a left side protecting member 28, and a right side protecting member 29 as illustrated in FIG. 6, and the respective protecting members 26, 27, 28, 29 have a plate shape. The materials used for the respective protecting members 26, 27, 28, 29 are flexible materials having elasticity (for example, rubber, elastomer), or metals (for example, aluminum alloy, iron, copper, stainless steel) and the like, and from the viewpoint of preventing the protecting structure 25 from being removed accidentally from the case 4 as described later, materials having a certain level of rigidity such as metals are preferable. For the reliable protection of the passengers, the savers for the passengers, and the handlers, mounting of an earth circuit 46 as described later on the protecting structure 25 is conceivable. In this case, the materials used for the respective protecting members 26, 27, 28, 29 are preferably materials having conductivity.

When the protecting structure 25 is formed by assembling the protecting members 26, 27, 28, 29, the protecting structure 25 has four surfaces, namely, a lower side surface in the vehicle vertical direction composed of the lower side protecting member 26, a rear side surface in the vehicle traveling direction composed of the rear side protecting member 27, a left side surface in the vehicle lateral direction composed of the left side protecting member 28, and a right side surface in the vehicle lateral direction composed of the right side protecting member 29, and the both side surfaces in the vehicle lateral direction of the protecting structure 25 is in a state of being coupled not only by the rear side surface in the vehicle traveling direction but also by the lower side surface in the vehicle vertical direction.

According to the configuration of the protecting structure 25 as described above, even though the vehicle collides and the air-conditioning unit body 2 of the vehicle air-conditioning unit 1 has an impact, the protecting structure 25 exists outside the case 4 of the air-conditioning unit body 2. Therefore, even though the case 4 is broken or deformed, the high-voltage components are prevented from dropping out (down), scattering, and exposed from the case.

In particular, since the protecting structure 25 includes the lower side protecting member 26 arranged on the lower side in the case 4 in the vehicle vertical direction, even though the protecting structure 25 has an impact, the left side protecting member 28 and the right side protecting member 29 do not open rearward or forward in the vehicle traveling direction. Therefore, even though the case 4 is broken or deformed, the electric heater 10 is prevented from dropping downward of the vehicle from the case 4 because the lower side protecting member 26 exists. Therefore, even though the electric heater 10 is broken by itself and the high-voltage components are exposed from the box portion 105, the electric heater 10 by itself stays within a range surrounded by the protecting structure 25, so that the savers for the passengers, the handlers or the like are prevented from coming into contact with the high-voltage components provided on the electric heater 10 with their fingers or the like. Furthermore, even though the case 4 is completely fragmented and the electric heater 10 and the protecting structure 25 drop out from the position of the vehicle air-conditioning unit 1, since the electric heater 10 is surrounded by the protecting structure 25, which is a frame member, the savers for the passengers or the handlers or the like are prevented from coming into contact with the high-voltage components provided on the electric heater 10 with their fingers or the like.

The protecting structure 25, however, is not limited to the mode including four protecting members, namely, the lower side protecting member 26, the rear side protecting member 27, the left side protecting member 28, and the right side protecting member 29 as described above. In other words, a configuration including only one of the lower side protecting member 26, the rear side protecting member 27, the left side protecting member 28, and the right side protecting member 29 illustrated in FIG. 6, a configuration including two protecting members out of the lower side protecting member 26, the rear side protecting member 27, the left side protecting member 28, and the right side protecting member 29 illustrated in FIG. 6 (for example, a combination of the lower side protecting member 26 and the rear side protecting member 27), or a configuration including three protecting members out of the lower side protecting member 26, the rear side protecting member 27, the left side protecting member 28, and the right side protecting member 29 illustrated in FIG. 6 (for example, a combination of the lower side protecting member 26, the left side protecting member 28, and the right side protecting member 29) are applicable.

In this manner even when the protecting structure 25 is composed of only one protecting member, two protecting members, or three protecting members, by arranging the protecting member on a side opposite to a side of the vehicle where an impact is applied with respect to the electric instrument, the electric instrument is prevented from dropping out, scattering, or exposed from the case.

Figure 7A:
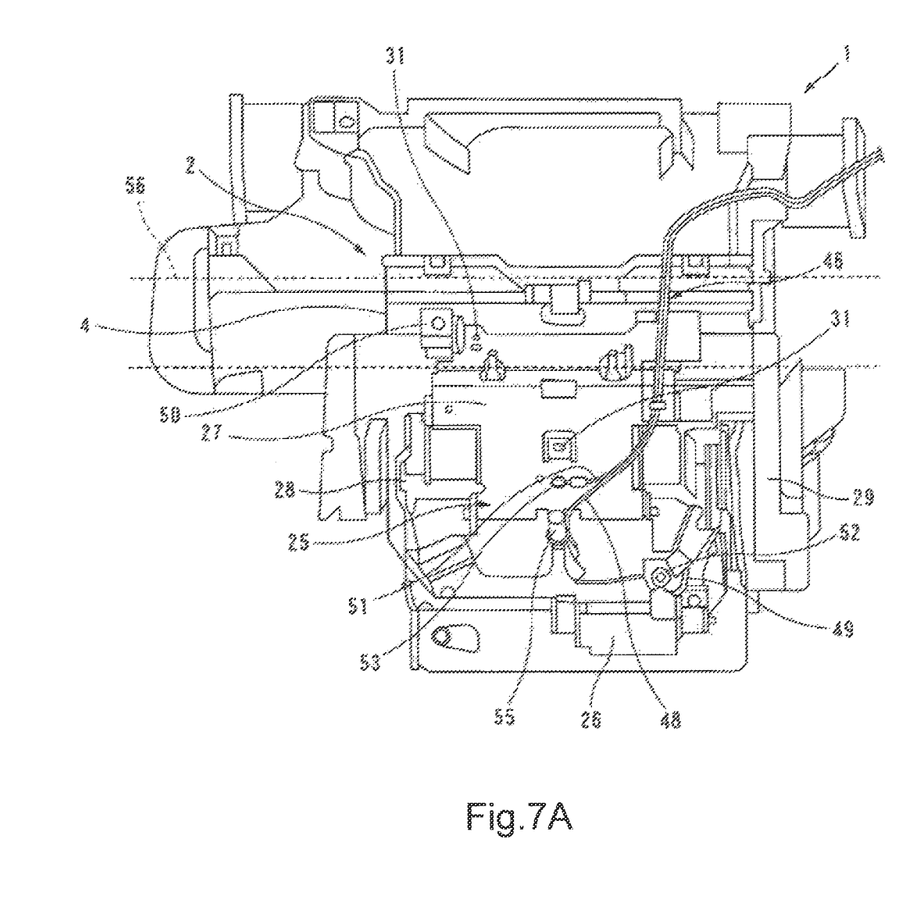
FIG. 7A illustrates a state in which an earth circuit is mounted on the protecting structure.
Figure 7B:
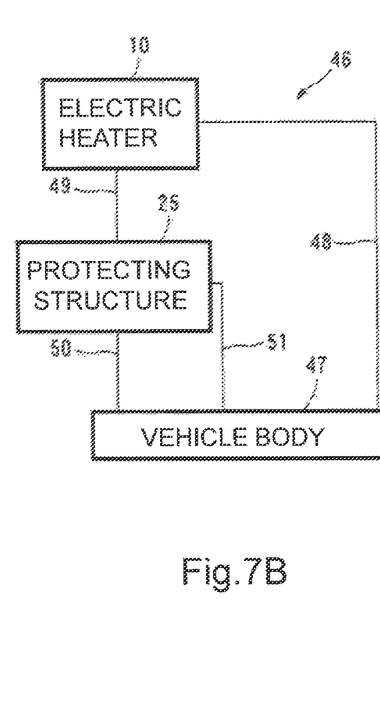
FIG. 7B is a schematic drawing of the earth circuit.

In the case where the protecting structure 25 is formed of a material having conductivity, the earth circuit 46 is mounted as described above. The earth circuit 46 in the mode of the protecting structure 25 having the four protecting members 26, 27, 28, 29 will be described with reference to FIG. 6 and FIG. 7.

The earth circuit 46 illustrated in FIG. 6 and FIG. 7 includes a harness-type earth member 48 configured to couple the electric heater 10 such as a PTC heater and a vehicle body 47 having conductivity such as a metal (the shape of the vehicle body 47 itself is not illustrated), a harness type earth member 49 configured to couple the electric heater 10 and the lower side protecting member 26, a bracket-type earth member 50 configured to couple the rear side protecting member 27 and a cross car beam 56 illustrated only in FIG. 7, and a harness type earth member 51 configured to couple the rear side protecting member 27 and the vehicle body 47. Conductive members are used for the earth members 48, 49, 50, and 51, respectively.

The earth member 48 is connected at one end thereof to the electric heater 10 and, in this example, is drawn out from between the lower side protecting member 26 and the rear side protecting member 27 to the outer side than the protecting members 26, 27. Furthermore the earth member is provided so as to be drawn along an outer side surface of the rear side protecting member 27 and directed toward the vehicle body 47. By coupling the other end to the vehicle body 47 via a coupler, which is not illustrated, the electric heater 10 and the vehicle body 47 are electrically connected. The earth member 48 may be drawn integrally with a power source cable 55 of the electric heater 10. The earth member 49 is connected at one end thereof to the electric heater 10 and, in this example, is drawn out from an opening or a gap formed in the lower side protecting member 26 to the outer side than the lower side protecting member 26. Then, by coupling the other end to the lower side protecting member 26 via a coupler 52 such as a bolt or a screw, the electric heater 10 and the lower side protecting member 26, which is part of the protecting structure 25 are electrically connected. The earth member 50 is shaped by bending a metallic plate, and is fixed to the rear side protecting member 27. Then, by coupling to the cross car beam 56 via a coupler, which is not illustrated, the rear side protecting member 27, which is part of the protecting structure 25 and the vehicle body 47 are electrically and mechanically connected. The earth member 50, however, may be manufactured by shaping part of the rear side protecting member 27 as needed. The earth member 51 is coupled at one end thereof to the rear side protecting member 27 via a coupler 53 such as a bolt or a screw and, in this example, is provided so as to be drawn together with the earth member 48 on the outside surface of the rear side protecting member 27 and directed toward the vehicle body 47. Then, by coupling the other end to the vehicle body 47 via a coupler, which is not illustrated, the rear side protecting member 27, which is part of the protecting structure 25, and the vehicle body 47 are electrically connected.

Accordingly, since the electric heater 10 is connected not only with the vehicle body 47 via the earth member 48, but also with the protecting structure 25 via the earth member 49, the function of the earth may be secured even though an electric joint of either one of the earth members is disconnected by an impact caused by a collision of the vehicle.

The protecting structure 25 is connected not only with the vehicle body 47 via the earth member 50, but also with the vehicle body 47 via the earth member 51, even though an electric joint of either one of the earth members is disconnected by an impact caused by a collision of the vehicle, the function of the earth may be secured.

In this manner, since a plurality of earth circuits are provided respectively on the electric heater 10 and the protecting structure 25, collateral damage of the passengers, the savers for the passengers, and the handlers may be prevented reliably.

Subsequently, a procedure to form the protecting structure 25 including four protecting members 26, 27, 28, 29 by mounting on the case 4 while coupling the protecting members 26, 27, 28, 29 with respect to each other will be described below.

Figure 8A:
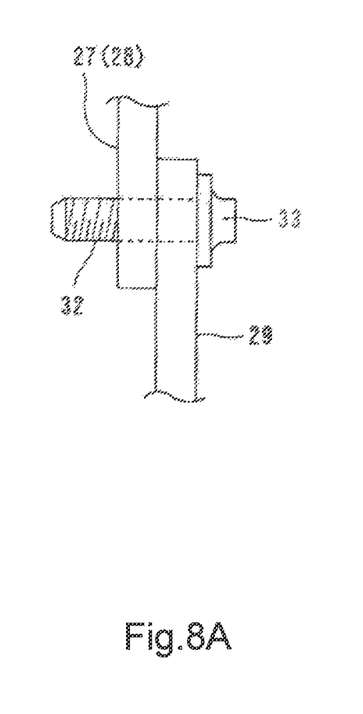
FIG. 8A is a schematic drawing illustrating a state in which the protecting members are coupled to each other via a coupler.

After the protecting member 27 (second protecting member) has mounted on the case 4, the protecting member 27 is fixed to the case 4 with fastening a screw 31. After the protecting member 28 (third protecting member) has mounted on the case 4, the protecting member 28 is fixed to the case 4 by fastening a screw 31. Then, after the protecting member 29 (fourth protecting member) has mounted on the case 4, the protecting member 29 is fixed to the case 4 by fastening a screw 31. Then, The protecting member 27 and the protecting member 28 are fastened with a fastening bolt 32 illustrated in FIG. 8, and the protecting member 27 and the protecting member 29 are also fastened with the fastening bolt 32 illustrated in FIG. 8, so that the protecting member 27 and the protecting members 28, 29 are firmly coupled. Finally, after the protecting member 26 (first protecting member) has mounted on the case 4 from the outer side (lower side) than the protecting members 28, 29, the protecting member 26 and the protecting members 28, 29 are fastened with the fastening bolt 32 illustrated in FIG. 8, so that the protecting member 26 is fixed to the case 4 via the protecting members 28, 29. Accordingly, the protecting members 26, 27, 28, 29 are mounted to the case 4 while being coupled with each other via the screw 31 and the fastening bolt 32, whereby the protecting structure 25 is formed.

Figure 8B:
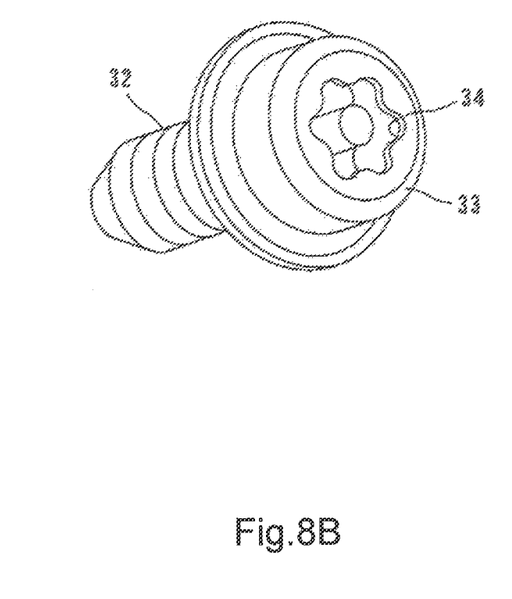
FIG. 8B is an explanatory drawing illustrating specifically a structure of a groove portion at a distal end of the coupler for coupling the protecting members to each other.

A groove portion 34 of a head portion 33 of the fastening bolt 32 is preferably formed to have a special shape instead of a groove portion for a cross-slot screwdriver or a groove portion for a flat-blade screwdriver which are normally used. Accordingly, unintentional removal of the protecting members 26, 27, 28, 29 by the user of the vehicle is prevented.

Figure 9A:
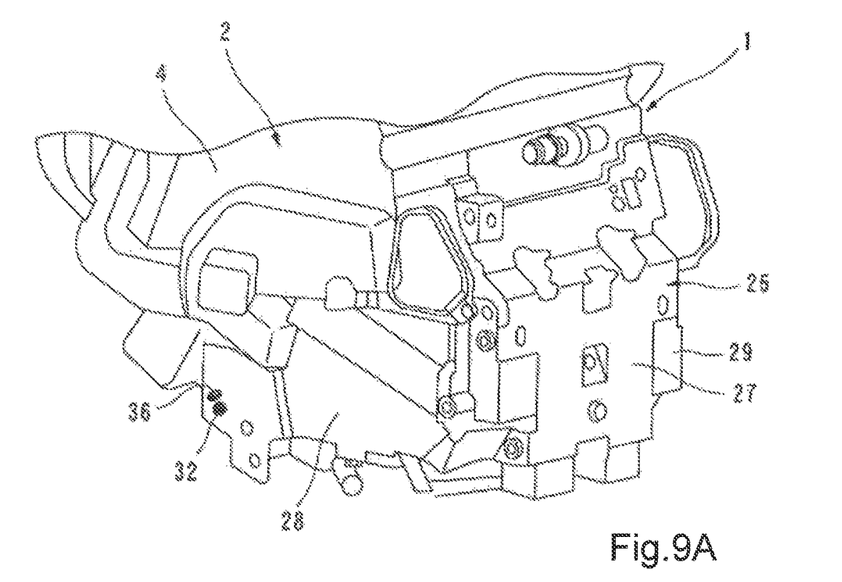
FIG. 9A is an explanatory drawing illustrating a structure for mounting the protecting member to the case on the lower side portion of the vehicle air-conditioning unit described above.
Figure 9B:
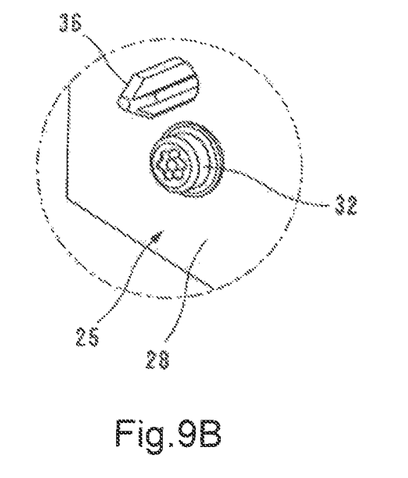
FIG. 9B is an explanatory drawing illustrating a state in which a projecting portion of the protecting member is inserted into a through hole of the case.
Figure 9C:
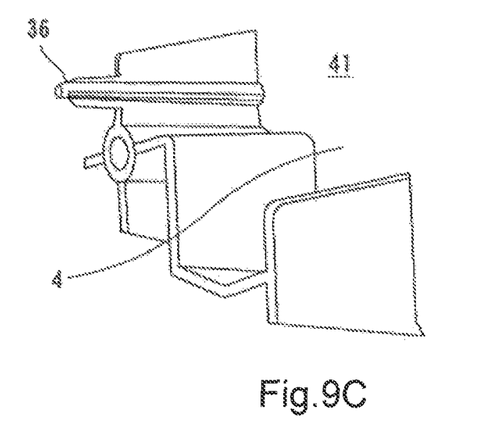
FIG. 9C is an explanatory drawing illustrating a form of the projecting portion formed on the protecting member.
Figure 10:
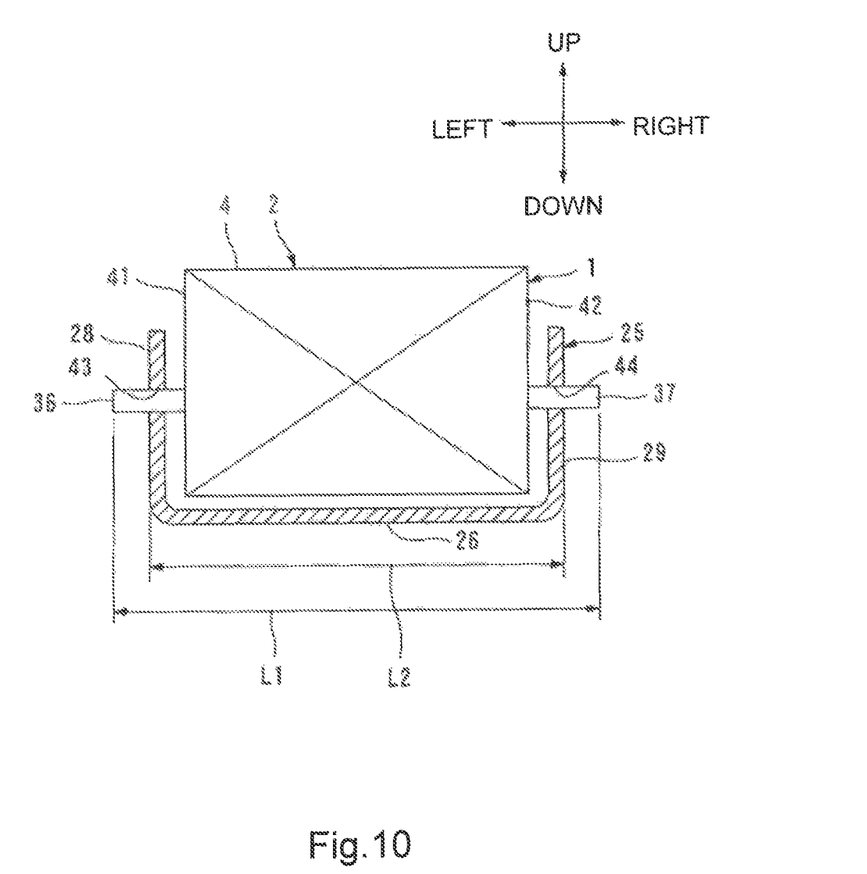
FIG. 10 is a schematic drawing illustrating the fact that the length between the distal ends of the projecting portions of the case is longer than a length between outer surfaces of the protecting members.

Furthermore, as a structure which can reliably prevent the unintentional removal of the protecting members 26, 27, 28, 29 of the protecting structure 25, which includes the four protecting members 26, 27, 28, 29, a structure illustrated in FIG. 9 and FIG. 10 is used in this embodiment.

In other words, a projecting portion 36 is provided on a surface 41 of the case 4 where the protecting member 28 is mounted, a projecting portion 37 is provided on a surface 42 of the case 4 where the protecting member 29 is mounted, and a through hole 43 is formed in the protecting member 28 at a position corresponding to the projecting portion 36, and a through hole 44 is formed in the protecting member 29 at a position corresponding to the projecting portion 37. A length L1 from a distal end of the projecting portion 36 of the case 4 in a projecting direction to a distal end of the projecting portion 37 of the case in the projecting direction is set to be larger than a length L2 from an outer surface of the protecting member 28 to an outer surface of the protecting member 29 when the protecting members 26, 27, 28, 29 are assembled to form the protecting structure 25.

Accordingly, in the case where the protecting structure 25 is formed by assembling the protecting members 26, 27, 28, 29 after the through hole 43 of the protecting member 28 has fitted on the projecting portion 36 of the case 4 to mount the protecting member 28 on the case 4, and the through hole 44 of the protecting member 29 has fitted on the projecting portion 37 of the case 4 to mount the protecting member 29 on the case 4, since the through holes 43, 44 of the protecting members 28, 29 are not disconnected from the projecting portions 36, 37 of the case 4, unintentional removal of the protecting structure 25 (protecting members 26, 27, 28, 29) is reliably prevented.

By fitting the through holes 43, 44 on the projecting portions 36, 37, positioning of the protecting members 26, 27, 28, 29 when being mounted on the case 4 is also achieved.

With the configuration described above, the electric instrument which is an object to be prevented from being touched by the savers or the handlers by the protecting structure 25 has been described as the electric heater 10 provided with the high-voltage components as an example. However, the invention is not limited thereto, and when the dust collecting apparatus or the ozone generating apparatus using the high voltage is used instead of the air filter 8, the dust collecting apparatus and the ozone generating apparatus are also considered to be the object.

By forming the protecting structure 25, which is not illustrated, by arranging the protecting member also on the upper side surface of the case 4 in the vehicle vertical direction and coupling the same with the protecting members 26, 27, 28, 29, an increase in strength as the frame member, and an increase in reliability of prevention of scatter of the electric instrument are achieved.

Furthermore, the earth member 50 has been described as being formed by bending and shaping the metallic plate as an example. However, a harness having conductivity may be used instead.

Finally, the type of the vehicle air-conditioning unit 1 is not limited to the vertical installation fully-integrated type illustrated in FIG. 1, and a semi-integrated type vehicle air-conditioning unit, which is not illustrated, in which the air blower 6 is offset in the vehicle lateral direction is also applicable.

REFERENCE SIGNS LIST 1 vehicle air-conditioning unit
2 air conditioning unit body
4 case
5 air flow channel
6 air blower
10 electric heater
25 protecting structure
26 lower side protecting member
27 rear side protecting member
28 left side protecting member
29 right side protecting member
36 projecting portion
37 projecting portion
43 through hole
46 through hole
46 earth circuit
105 box portion of electric heater

The invention claimed is:

1. A vehicle air-conditioning unit in which air is introduced from an outside into a case and air-conditioned air is fed into a cabin with an air blower, the vehicle air-conditioning unit arranged on a cabin side of a partitioning plate which partitions an engine room defined in the front of a vehicle traveling direction and the cabin and including an electric instrument being stored in the case, wherein the electric instrument is at least any one of an electric heating apparatus, a dust collecting apparatus, and an ozone generating apparatus, the vehicle air-conditioning unit comprising:

a protecting structure configured to prevent the electric instrument from scattering, wherein the protecting structure is composed of at least one of a lower side protecting member arranged on a lower side of the electric instrument in a vehicle vertical direction, a rear side protecting member arranged on a rear side of the electric instrument in a vehicle fore-and-aft direction, a left side protecting member arranged on a left side of the electric instrument in a vehicle lateral direction, and a right side protecting member arranged on a right side of the electric instrument in a vehicle lateral direction, the protecting structure different from the partitioning plate and the case, said protecting structure formed of a plate-shaped member.

2. The vehicle air-conditioning unit according to claim 1, wherein the protecting structure is arranged outside the case.

3. The vehicle air-conditioning unit according to claim 2, wherein the protecting structure is formed of a conductive material, and is provided with an earth circuit mounted thereon.

4. The vehicle air-conditioning unit according to claim 2, wherein the protecting structure is formed of a plate-shaped member.

5. The vehicle air-conditioning unit according to claim 2, wherein the protecting structure is formed of a flexible member.

6. The vehicle air-conditioning unit according to claim 2, wherein the protecting structure is composed of at least two or more of a lower side protecting member arranged on a lower side of the electric instrument in a vehicle vertical direction, a rear side protecting member arranged on a rear side of the electric instrument in a vehicle fore-and-aft direction, a left side protecting member arranged on a left side of the electric instrument in a vehicle lateral direction, and a right side protecting member arranged on a right side of the electric instrument, and wherein a plurality of the protecting members are formed by being integrally coupled.

7. The vehicle air-conditioning unit according to claim 6, wherein the protecting structure is formed by mounting the lower side protecting member, the rear side protecting member, the left side protecting member, and the right side protecting member respectively to the case, and then coupling the four protecting members to each other, and wherein:
  the case is formed with projections on two or more surfaces of four surfaces thereof opposing four surfaces of the protecting structure,
  the protecting structure is provided with through holes at positions corresponding to the projections, the projections and the through holes are fitted to each other when the four protecting members are mounted on the case, and
  a length from a distal end of one of the projections to a distal end of the other projection is longer than a length between opening edges of the two through holes to which the two projections are fitted.

8. The vehicle air-conditioning unit according to claim 1, wherein the protecting structure is formed of a conductive material, and is provided with an earth circuit mounted thereon.

9. The vehicle air-conditioning unit according to claim 1, wherein the protecting structure is formed of a flexible member.

10. The vehicle air-conditioning unit according to claim 1, wherein the protecting structure is composed of at least two or more of a lower side protecting member arranged on a lower side of the electric instrument in a vehicle vertical direction, a rear side protecting member arranged on a rear side of the electric instrument in a vehicle fore-and-aft direction, a left side protecting member arranged on a left side of the electric instrument in a vehicle lateral direction, and a right side protecting member arranged on a right side of the electric instrument in a vehicle lateral direction, and wherein a plurality of the protecting members are formed by being integrally coupled.

11. The vehicle air-conditioning unit according to claim 10, wherein the protecting structure is formed by mounting the lower side protecting member, the rear side protecting member, the left side protecting member, and the right side protecting member respectively to the case, and then coupling the four protecting members to each other, and wherein:
  the case is formed with projections on two or more surfaces of four surfaces thereof opposing four surfaces of the protecting structure,
  the protecting structure is provided with through holes at positions corresponding to the projections, the projections and the through holes are fitted to each other when the four protecting members are mounted on the case, and
  a length from a distal end of one of the projections to a distal end of the other projection is longer than a length between opening edges of the two through holes to which the two projections are fitted.

12. A vehicle comprising the vehicle air-conditioning unit according to claim 1.

13. The vehicle according to claim 12, wherein the protecting structure is arranged outside the case.

* * * * *